(12) United States Patent
Klos

(10) Patent No.: US 7,975,569 B2
(45) Date of Patent: Jul. 12, 2011

(54) TELESCOPABLE STEERING SPINDLE ARRANGEMENT

(75) Inventor: Martin Klos, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/333,942

(22) Filed: Dec. 12, 2008

(65) Prior Publication Data

US 2009/0151499 A1 Jun. 18, 2009

(30) Foreign Application Priority Data

Dec. 13, 2007 (DE) .......................... 10 2007 060 149

(51) Int. Cl.
*B62D 1/18* (2006.01)
*B62D 1/00* (2006.01)
*F16C 3/00* (2006.01)

(52) U.S. Cl. ........................... 74/493; 280/777; 464/182

(58) Field of Classification Search .................... 74/492, 74/493, 89.35; 280/775, 777; 464/162, 182
See application file for complete search history.

(56) References Cited

U.S. PATENT DOCUMENTS

| 3,973,468 | A | * | 8/1976 | Russell, Jr. .................. 91/25 |
| 4,805,478 | A |   | 2/1989 | Beauch |
| 5,685,565 | A |   | 11/1997 | Schafer et al. |
| 6,019,391 | A |   | 2/2000 | Stuedemann et al. |
| 6,099,036 | A | * | 8/2000 | Fujiu et al. .................. 280/777 |
| 6,223,619 | B1 | * | 5/2001 | Shibata et al. .................. 74/492 |
| 6,339,970 | B1 |   | 1/2002 | Blex |
| 6,389,923 | B1 |   | 5/2002 | Barton et al. |
| 7,370,553 | B2 |   | 5/2008 | Kittler et al. |
| 2005/0156423 | A1 |   | 7/2005 | Appleyard |

FOREIGN PATENT DOCUMENTS

| DE | 19504036 C1 | 6/1996 |
| DE | 19820291 A1 | 11/1999 |
| DE | 19945160 A1 | 3/2000 |
| DE | 10033810 A1 | 1/2002 |
| DE | 10055608 A1 | 5/2002 |
| DE | 102006001228 A1 | 7/2007 |
| EP | 0317791 A2 | 5/1989 |
| EP | 0936130 A1 | 8/1999 |
| EP | 0997369 A2 | 5/2000 |
| GB | 2349118 A | 10/2000 |
| GB | 2408970 A | 6/2005 |

OTHER PUBLICATIONS

German Search Report dated Dec. 18, 2008, issued in Application No. 10 2007 060 149.4.
Great Britain Search Report dated Mar. 4, 2009, issued in Application No. GB0822049.3.

* cited by examiner

*Primary Examiner* — Thomas R Hannon
*Assistant Examiner* — Phillip A Johnson
(74) *Attorney, Agent, or Firm* — Ingrassia Fisher & Lorenz, P.C.

(57) ABSTRACT

A telescopable steering spindle arrangement is provided that includes, but is not limited to a steering spindle near the steering wheel, an intermediate spindle mounted rotationally fixedly and telescopably therein. The steering spindle near the steering wheel and the intermediate spindle are connected axially frictionally to one another, as well as a steering spindle near the steering gear. The intermediate spindle is mounted rotationally fixedly and telescopably in the steering spindle near the steering gear, and the intermediate spindle and the steering spindle near the steering gear are connected axially positively to one another.

9 Claims, 2 Drawing Sheets

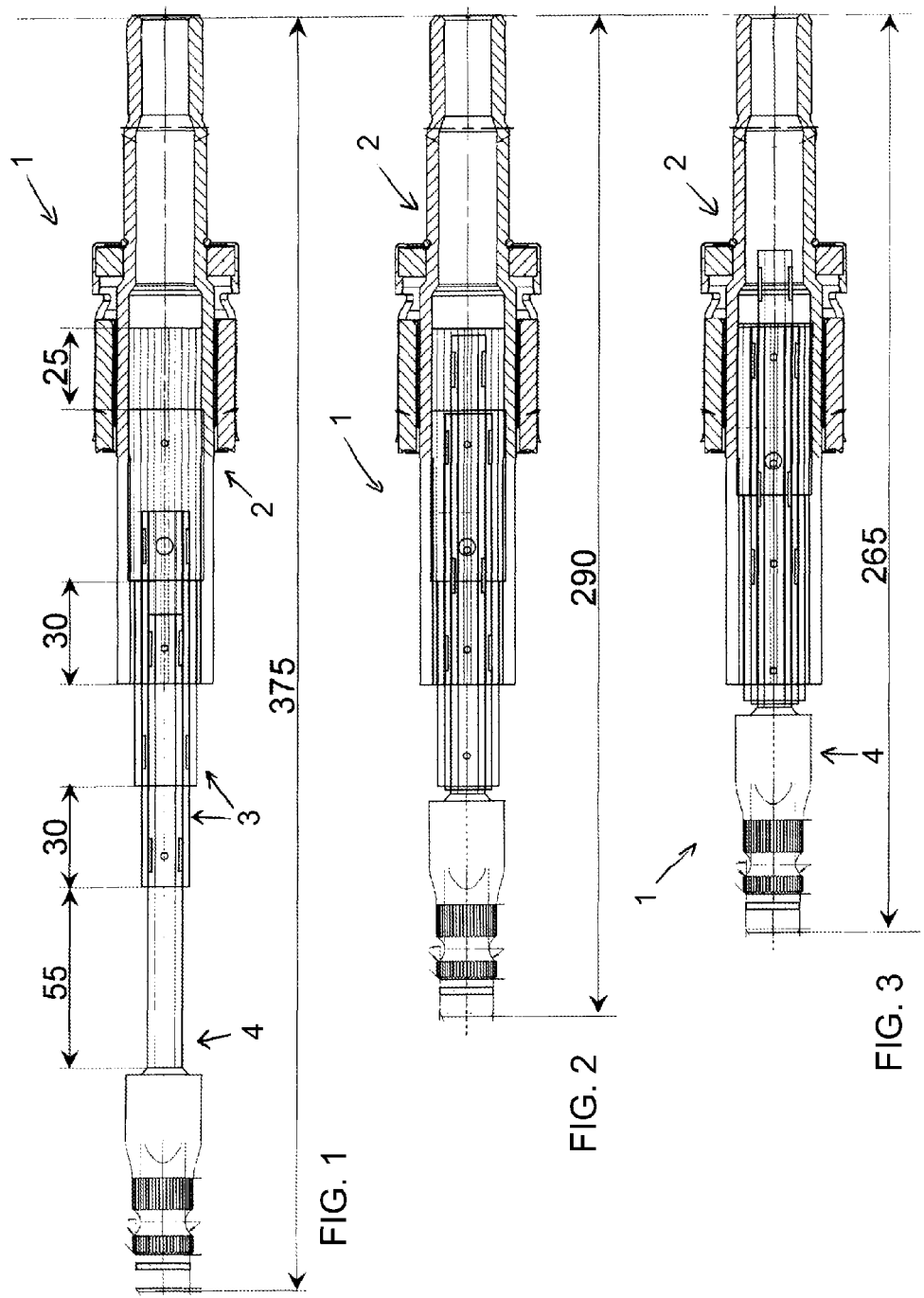

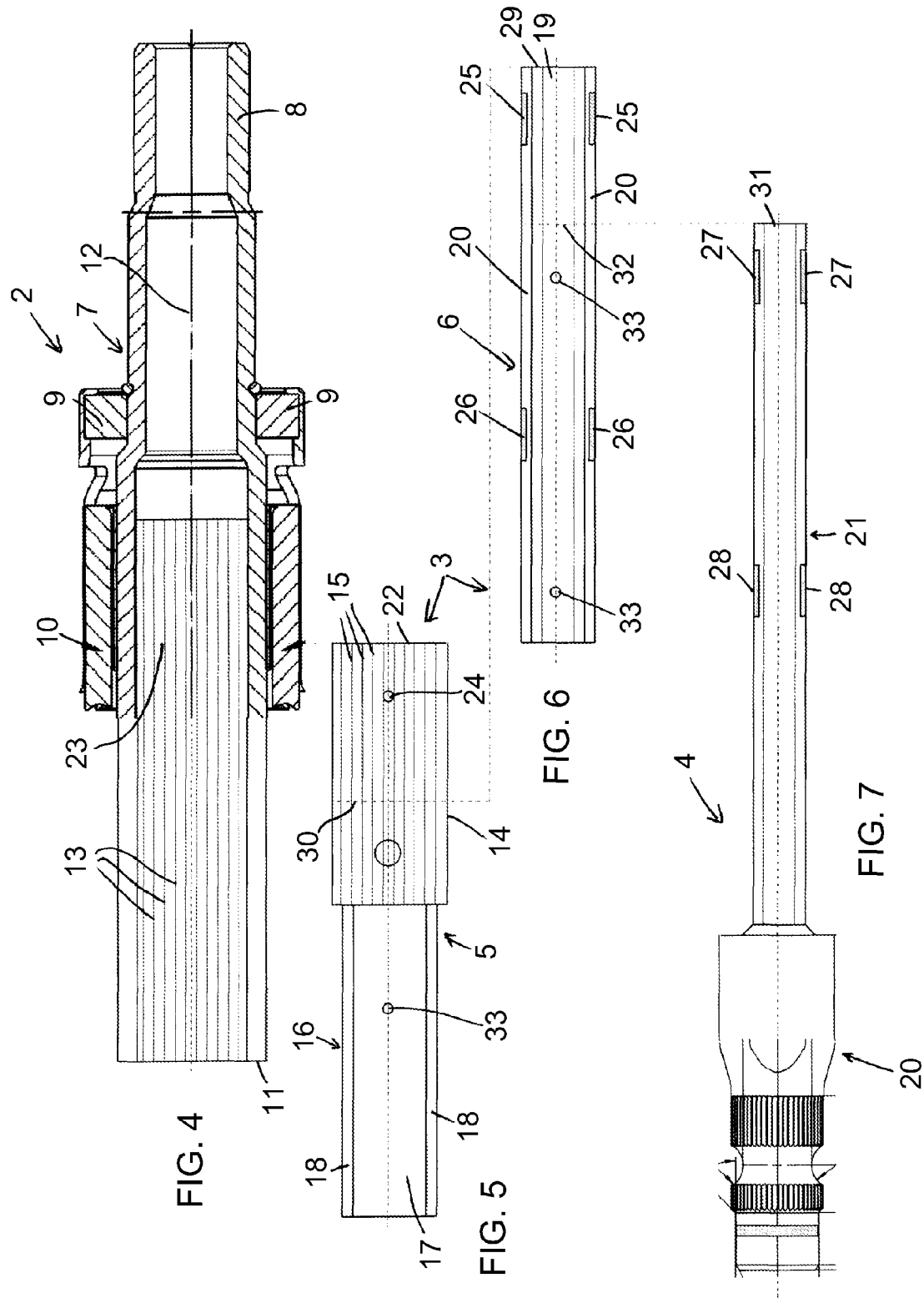

TELESCOPABLE STEERING SPINDLE ARRANGEMENT

CROSS-REFERENCE TO RELATED APPLICATION

This application claims priority to German Patent Application No. 102007060149.4, filed Dec. 13, 2007, which is incorporated herein by reference in its entirety.

TECHNICAL FIELD

The technical field relates to a telescopable steering spindle arrangement.

BACKGROUND

DE 100 55 608 A1 describes a telescopable steering spindle arrangement comprising a steering spindle near the steering wheel and a steering spindle near the steering gear. The walls of the facing ends of the two steering spindles are disposed in an overlapping manner and connected to one another by means of a press fit. This ensures durability and direct torque transmission. In the event of a crash, the deformation energy of the steering spindle is absorbed exactly via the dimensioning of the press fit.

EP 0 997 369 A2 likewise describes a telescopable steering spindle arrangement comprising two steering spindles. The steering spindles guided into one another are connected by a shear element which, when high shear forces are introduced in the event of a crash, shears off and thus allows the steering spindle arrangement to telescope for the purpose of reducing its overall length. Further telescopable steering spindle arrangements are described in DE 10 2006 001 228 B3 and EP 0 317 791 A2.

When telescopable steering spindle arrangements are built into motor vehicles, especially automobiles, only relatively little installation space is available for the steering spindle arrangement. Within this installation space, necessary displacement paths for adjustment of the comfort of the steering column arrangement in a range of ±25/30 mm and an absorber path for crash requirements of at least 85 mm cannot be achieved with conventional two-part steering column arrangements comprising upper and lower steering spindles.

In practice, in telescopable steering column arrangements, the upper and lower steering spindles are usually designed on a multitoothed basis and inserted inside one another. With this design, the adjustment and absorber path may be achieved relatively simply with a sufficiently large overlap. In a rigid steering spindle arrangement, the upper steering spindle is injection-molded with the lower steering spindle by means of plastic ensheathing of the inner (lower) steering spindle. This injection molding may be released under a defined force so that an inner displacement may take place in the event of a crash.

In view of the foregoing, at least one object of the present invention is to provide a telescopable steering column arrangement, which makes it possible to achieve an axial comfort adjustment and axial absorber adjustment with short installation space for the steering column arrangement. In addition, other objects, desirable features, and characteristics will become apparent from the subsequent summary and detailed description and the appended claims, taken in conjunction with the accompanying drawings and this background.

SUMMARY

Embodiments of the invention propose a telescopable steering spindle arrangement comprising a steering spindle near the steering wheel, an intermediate spindle mounted rotationally fixedly and telescopably therein. The steering spindle near the steering wheel and the intermediate spindle are connected axially frictionally to one another, as well as a steering spindle near the steering gear, wherein the intermediate spindle is mounted rotationally fixedly and telescopably in the steering spindle near the steering gear, and the intermediate spindle and the steering spindle near the steering gear are connected axially positively to one another.

In the steering spindle arrangement according embodiments of the invention, the comfort adjustment between the steering spindle near the steering wheel and the intermediate spindle therefore takes place as a result of the axial frictional connection between the steering spindle near the steering wheel and the intermediate spindle. The absorber adjustment, hence the adjustment in the event of a crash, takes place between the intermediate spindle and the steering spindle near the steering gear. In particular, at least one shear element is disposed there between, and due to the axial positive connection between intermediate spindle and steering spindle near the steering gear, a telescopic displacement of these spindles only takes place on reaching a predetermined crash force. This crash force may be predetermined in particular by dimensioning the at least one shear element.

The telescopable steering spindle arrangement is therefore divided according to embodiments of the invention into different "structural systems." The one structural system allows the comfort adjustment and the other structural system allows the absorber adjustment. These different adjustment variants may be accomplished in a short installation space (i.e., with a short overall length). In particular, the adjustment path in the event of a crash may be designed independently of the adjustment path as a result of the comfort adjustment. This is an advantage for using the vehicle in markets which impose different requirements.

According to a preferred further embodiment of the invention, it is provided that the intermediate spindle is configured in two parts, comprising a first spindle section, which is connected to the steering spindle near the steering wheel, and comprising a second spindle section, which is connected to the steering spindle near the steering gear. The one spindle section is mounted rotationally fixedly and telescopably in the other spindle section, and the two spindle sections are connected axially positively to one another by means of at least one shear element.

The mounting of the two spindle sections of the intermediate sections is therefore preferably accomplished in accordance with the mounting of the intermediate spindle in the steering spindle near the steering gear. In this further development described, two independent regions are therefore formed for the crash telescoping which may be designed differently so that firstly one region telescopes in the event of a crash and only subsequently does the second region telescope in the event of a crash.

According to a preferred further embodiment of the invention, it is provided that the intermediate spindle has an outer toothed structure and the intermediate spindle is inserted in the area of the outer toothed structure into a receptacle of the steering spindle near the steering wheel, having an inner toothed structure. Due to this configuration, the axial displaceability of intermediate spindle and steering spindle near the steering wheel may be accomplished constructively simply with a torsionally fixed connection at the same time. In this connection, a preferred embodiment provides that a space for receiving an element, in particular an injection-molded part, is formed between the inner toothed structure and the outer toothed structure. This forms the axial frictional connection between intermediate spindle and steering spindle near the steering wheel.

Expediently, the steering spindle near the steering gear has a region having a polygonal cross section and the steering spindle near the steering gear is inserted in the area of its angular cross section into a receptacle of the intermediate spindle having a polygonal cross section. Between the region of the polygonal cross section of the steering spindle near the steering gear and the region of the polygonal cross section of the receptacle of the intermediate spindle, a space is formed for receiving an element, in particular an injection-molded part, which engages positively in recesses of the steering spindle near the steering gear and the intermediate spindle.

This configuration of the engagement region of steering spindle near the steering gear and intermediate spindle allows the transmission of the torque of the steering spindle arrangement in this region due to the configuration of the polygonal cross sections, while the at least one element effects the axial positive connection between steering spindle near the steering gear and intermediate spindle. Due to the design of the element, in the event of a predetermined crash force introduced axially into the steering gear arrangement, this region is sheared off with the result that the steering spindle near the steering gear and the intermediate spindle travel into one another.

For the case where the intermediate spindle is configured in two parts, thus comprising the first and the second spindle section, the configuration of the two spindle sections and the shear element effective between them corresponds to the previously described configuration of the connection of the steering spindle near the steering gear and the intermediate spindle.

It is considered to be advantageous if the element and/or the frictional connection between steering spindle near the steering wheel and intermediate spindle is formed by a plastic injection-molded part. Expediently, the frictional connection between steering spindle near the steering wheel and intermediate spindle on the one hand and the positive connection between steering spindle near the steering gear and intermediate spindle or between the two spindle sections of the intermediate spindle on the other hand, is dimensioned in such a manner that in the event of a crash, the frictional connection is overcome temporally before the positive connection, in particular the positive connections are overcome successively.

The embodiments of the invention therefore propose a telescopable steering spindle arrangement in which at least three individual components, in particular four individual components, are formed, in which two or three of the individual components may be successively telescoped in the event of a crash due to different injection molding parameters. In addition, this combination in conjunction with the steering spindle near the steering wheel is displaceable for the comfort adjustment. In particular, the first part of the displacement in the event of a crash takes place until the intermediate spindle or the spindle section of the intermediate spindle near the steering wheel stops in the steering spindle near the steering wheel. Thereafter, due to a force peak the connection between the one-part intermediate spindle and the steering spindle near the steering gear is released or in the case of the two-part intermediate spindle, the connection between the two spindle sections is initially released and then the connection between the steering spindle near the steering gear and the spindle section of the intermediate spindle cooperating therewith. As a result, a relatively large crash absorber path may be achieved with high overlap of the individual spindles of the steering spindle arrangement. A comfort adjustment of about ±25/30 mm and an absorber path for the crash requirements of at least about 85 mm is advantageous.

BRIEF DESCRIPTION OF THE DRAWINGS

The present invention will hereinafter be described in conjunction with the following drawing figures, wherein like numerals denote like elements, and:

FIG. 1 shows a telescopable steering spindle, viewed from the side, the steering spindle arrangement having nominal length;

FIG. 2 shows the steering spindle arrangement in a diagram according to FIG. 1, illustrated for the reduced length due only to the crash path of the steering spindle arrangement;

FIG. 3 shows the steering spindle arrangement in a diagram according to FIG. 1, illustrated for the reduced length, but illustrated for the crash and adjustment path;

FIG. 4 shows a view according to FIG. 1 of the steering spindle near the steering wheel;

FIG. 5 shows a view according to FIG. 1 of the first spindle section of the intermediate spindle;

FIG. 6 shows a view according to FIG. 1 of the second spindle section of the intermediate spindle; and FIG. 7 shows a view according to FIG. 1 of the steering spindle near the steering gear.

DETAILED DESCRIPTION

The following detailed description is merely exemplary in nature and is not intended to limit application and uses. Furthermore, there is no intention to be bound by any theory presented in the preceding background and summary or the following detailed description.

The telescopable steering spindle arrangement 1 according to an embodiment of the invention is formed by a steering spindle 2 near the steering wheel, a two-part intermediate spindle 3, and a steering spindle 4 near the steering gear. The intermediate spindle 3 comprises a first spindle section 5, which is connected to the steering spindle 2 near the steering wheel and a second spindle section 6, which is connected to the steering spindle 4 near the steering gear.

FIG. 1 illustrates the steering spindle arrangement 1 with nominal length, which is about 375 mm. FIG. 2 shows the partially retracted steering spindle arrangement 1, therefore with reduced length, a length of about 290 mm being illustrated. This length corresponds to the theoretical reduction in the length of the steering spindle arrangement 1 only taking into account the length reduction in the event of a crash.

FIG. 3 shows a further reduced length of the steering spindle arrangement 1 of about 265 mm. The change in length in the event of a crash and in the event of a comfort adjustment is taken into account.

The structure of the telescopable steering spindle arrangement 1 is as follows, where reference is made in particular to the representation in FIG. 4 to FIG. 7 for this purpose:

As may be deduced from the diagram in FIG. 4, the steering spindle 2 near the steering wheel comprises a multiply cranked tube 7. This tube 7 is disposed in the area of the upper end of a steering column not shown, in particular a steering column of an automobile. In the area of one end, the tube 7 is configured as a steering wheel receptacle 8. The tube 7 is enclosed by a bearing 9, which is used for the fixed mounting of the steering spindle 2. Further, a locking sleeve 10 externally enclosing said tube, is connected to the tube 7, which cooperates with a steering wheel lock (not shown). Starting from the bearing 9 as far as the end 11 of the steering spindle 2 facing away from the steering wheel receptacle 8, extending approximately over half the steering spindle 2. The spindle is provided with an internal toothed structure 13 running parallel to the longitudinal axis 12 of the steering spindle 2 and therefore also parallel to the steering spindle arrangement 1.

The first spindle section 5 of the intermediate spindle 3 has a section 14 provided with an external toothed structure 15. The spindle section 5 is inserted in the area of its external toothed structure 15 into the region of the tube 7 provided with the internal toothed structure 13.

The region of the external toothed structure 15 of the spindle section 5 extends over a length which is slightly less than half the length of the spindle section 5. Over the remaining length, therefore the section 16, the spindle section 5 is provided with a polygonal profile. This appears as a circular cross section flattened at the top and bottom, so that this section 16 comprises an upper flat face 17, and parallel thereto, a lower face not shown, the curved lateral sections 18 being disposed between the two faces. The spindle section 5 is inwardly hollow, thus configured as a tube. In the area of the section 16, the inner contour of the spindle section 5 corresponds to its outer contour. On the inside, the section 16 is thus formed by an upper face, a lower face disposed parallel thereto, and lateral faces connecting the two faces.

The other spindle section 6 may be inserted into the section 16 of the spindle section 5. According to the external configuration of the section 16 of the spindle section 5, but with smaller dimensions, since the spindle section 6 is inserted into the spindle section 5, the spindle section 6 continuously comprises an upper face 19, a lower face, not illustrated, disposed parallel thereto, and two lateral faces 20 connecting the two faces.

The spindle section 6, like the section 16 of the spindle section 5, is configured as a tube. In a corresponding manner, the interior of the spindle section 6 comprises an upper face, a lower face disposed parallel hereto, and outwardly curved lateral faces disposed between these two faces.

This passage of the spindle section 6 is used to receive the steering spindle 4 near the steering gear. The steering spindle 4 has a relatively short shoulder, which is used for connecting it to a steering gear or a universal joint connected to the steering gear. Over the remaining length of the steering spindle 4, this has a section 21, whose external cross section is configured to correspond in shape to the internal cross section of the spindle section 6, therefore comprises the surface, the lower face parallel hereto, and the outwardly curved lateral faces connecting the two faces.

The arrangements according to FIG. 1 to FIG. 3 may be depicted on the basis of this configuration of the steering spindle 2, spindle sections 5 and 6 of the intermediate spindle 3, and the steering spindle 4.

The starting point here is the production of the telescopable steering spindle arrangement 1 according to FIG. 1. In this case, it is necessary to connect the steering spindle 2 to the spindle section 5, further the spindle section 5 to the spindle section 6, finally the spindle section 6 to the steering spindle 4. The connection between steering spindle 2 and spindle section 5 is made by frictional contact. To this end, in the nominal position of steering spindle 2 and spindle section 5, in which the front face 22 of the spindle section 5 is aligned with the position line 23 of the steering spindle 2, plastic is injected through a hole 24 in the area of the external toothed structure 15 of the spindle section 5 between the internal and external toothed structures 13, 15 disposed with some clearance with respect to one another, so that a frictional contact is formed between internal toothed structure 13 and external toothed structure 15. This frictional contact may be overcome by applying an adjusting force for adjusting the steering wheel of the vehicle so that a comfort adjustment of the steering wheel may be made over a path of about 25 mm in one direction or in the opposite direction, starting from the initial position, thus a total comfort adjustment path of 50 mm.

In order to create the positive connection between section 16 of the spindle section 5 and spindle section 6 on the one hand and between spindle section 6 and section 21 of steering spindle 4 on the other hand, the spindle section 6 is provided externally with indentations 25 facing the steering wheel and indentations 26 facing the steering gear, and the steering spindle 4 is provided in the area of the section 21 with indentations 27 facing the steering wheel and indentations 28 facing the steering gear.

The spindle section 6 is inserted so far into the spindle section 5 that the front face 29 of the spindle section 6 is in alignment with the position line 30 of the spindle section 5. Furthermore, the steering spindle 4 is inserted with its section 21 so far into the spindle section 6 that the front face 31 of the steering spindle 4 is in alignment with the position line 32 of the spindle section 6. The spindle section 6 is therefore inserted with radial clearance into the spindle section 5 and the section 21 of the steering spindle 4 is inserted with radial clearance into the spindle section 6. In order to eliminate this radial clearance and bring about the positive connection between the parts, plastic is injected through holes 33 in the two spindle section 5 and 6 into the intermediate spaces between the spindle section 5 and the spindle section 6 or the spindle section 6 and the section 21 of the steering spindle 4. This plastic also fills the indentations 25, 26, 27, and 28 so that an axial position connection may be achieved between the spindle section 5 and the spindle section 6 on the one hand, and between the spindle section 6 and the steering spindle 4 on the other hand.

The embodiment illustrates that everywhere where the injected plastic engages in the indentations 25, 26, 27, and 28, a shear element is formed by cooperation of these indentations with the holes 33 of the component respectively facing the indentations.

Depending on the dimensions of the shear element formed by the plastic injection molding, a matched sequence of displacement from steering spindle 4 to the second spindle section 6 or the second spindle section 6 to the first spindle section 5 or the first spindle section 5 to the steering spindle 2 may be achieved. In the event of a crash, the displacement preferably takes place initially in the area of the comfort adjustment, hence the displacement of the first spindle section 5 relative to the steering spindle 2. This is followed by the displacement of the second spindle section 6 to the first spindle section and finally the displacement of the steering spindle 4 to the spindle section 6.

As is illustrated in FIG. 1 and FIG. 2, in the event of a crash, a two-stage crash deformation of the steering spindle arrangement 1 may be achieved due to destruction of the shear element; in the first step by 30 mm, in the second step by about 55 mm. A reduction in the length of the steering spindle arrangement from about 375 mm to about 290 mm may be achieved merely in relation to the crash path. The length of the steering spindle arrangement may be reduced by about a further 25 mm, hence to about 265 mm, by adjustment of the steering spindle arrangement in the area of the comfort adjustment.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A telescopable steering spindle arrangement, comprising:
   a steering spindle proximate a steering wheel;
   an intermediate spindle mounted rotationally fixedly and telescopably within the steering spindle proximate the steering wheel,
   wherein the steering spindle proximate the steering wheel and the intermediate spindle are connected axially frictionally to one another; and
   a second steering spindle proximate a steering gear,
      wherein the intermediate spindle is mounted rotationally fixedly and telescopably on the second steering spindle proximate the steering gear,
      wherein the intermediate spindle and the second steering spindle proximate the steering gear are connected axially positively to one another, and
      wherein the intermediate spindle comprises a first part and a second part, said first part and said second part comprising a first spindle section which is connected to the steering spindle proximate the steering wheel, and further comprises a second spindle section, which is connected to the second steering spindle proximate the steering gear, wherein the second spindle section is mounted rotationally fixedly and telescopably in the first spindle section, and the first spindle section and the second spindle section are connected axially positively to one another.

2. The telescopable steering spindle arrangement according to claim 1, wherein the intermediate spindle has an outer toothed structure and the intermediate spindle is inserted in an area of the outer toothed structure into a receptacle of the steering spindle proximate the steering wheel, the receptacle having an inner toothed structure.

3. The telescopable steering spindle arrangement according to claim 2, wherein a space for receiving an element is formed between the inner toothed structure and the outer toothed structure.

4. The telescopable steering spindle arrangement according to claim 1, wherein the second steering spindle proximate the steering gear has a region having a polygonal cross section and the second steering spindle proximate the steering gear is inserted in an area of the polygonal cross section into a receptacle of the intermediate spindle having a polygonal cross section, wherein between the region of the polygonal cross section of the second steering spindle proximate the steering gear and the region of the polygonal cross section of the receptacle of the intermediate spindle, a space is formed for receiving an element that engages positively in a plurality of recesses of the second steering spindle proximate the steering gear and the intermediate spindle.

5. The telescopable steering spindle arrangement according to claim 1, wherein the second spindle section has a region having a polygonal cross section and the second spindle section is inserted in an area of the polygonal cross section into a receptacle of the first spindle section having a polygonal cross section, wherein between the region of the polygonal cross section of the second spindle section and the region of the polygonal cross section of the first spindle section, a space is formed for receiving an element which engages positively in recesses of the first spindle section and the second spindle section.

6. The telescopable steering spindle arrangement according to claim 5, wherein the element comprises an injection molded part.

7. The telescopable steering spindle arrangement according to claim 1, wherein an axially positive connection is accomplished by means of at least one shear element.

8. The telescopable steering spindle arrangement according to claim 1, wherein a frictional connection between the steering spindle proximate the steering wheel and the intermediate spindle is formed by a plastic injection-molded part.

9. The telescopable steering spindle arrangement according to claim 1, wherein a frictional connection between the steering spindle proximate the steering wheel and the intermediate spindle on one hand and a positive connection between the second steering spindle proximate the steering gear and the intermediate spindle is dimensioned in such a manner that in an event of a crash, the frictional connection is overcome temporally before positive connections, and the positive connections are overcome successively.

* * * * *